(12) United States Patent
Rebholz-Goldmann

(10) Patent No.: US 7,728,717 B2
(45) Date of Patent: Jun. 1, 2010

(54) SWITCHING REGULATOR, TRANSCEIVER CIRCUIT, AND KEYLESS ACCESS CONTROL SYSTEM

(75) Inventor: Peter Rebholz-Goldmann, Neuenstadt (DE)

(73) Assignee: Atmel Automotive GmbH, Heilbronn (DE)

( * ) Notice: Subject to any disclaimer, the term of this patent is extended or adjusted under 35 U.S.C. 154(b) by 276 days.

(21) Appl. No.: 11/892,157

(22) Filed: Aug. 20, 2007

(65) Prior Publication Data

US 2008/0074236 A1    Mar. 27, 2008

Related U.S. Application Data

(60) Provisional application No. 60/838,376, filed on Aug. 18, 2006.

(30) Foreign Application Priority Data

Aug. 18, 2006    (DE) .................. 10 2006 038 936

(51) Int. Cl.
*B60R 25/04*    (2006.01)
*G07C 9/00*    (2006.01)

(52) U.S. Cl. .................... 340/426; 307/10.1
(58) Field of Classification Search ......... 323/282–290; 455/260, 333, 86, 88, 552.1, 183.2; 307/10.1–10.5, 307/64, 66; 340/5.22–5.26, 5.61–5.67, 426
See application file for complete search history.

(56) References Cited

U.S. PATENT DOCUMENTS

| | | | |
|---|---|---|---|
| 4,683,554 A | 7/1987 | Lockwood et al. | |
| 4,719,460 A * | 1/1988 | Takeuchi et al. | ........... 340/5.62 |
| 4,823,316 A | 4/1989 | Riva | |
| 4,885,674 A | 12/1989 | Varga et al. | |
| 4,975,820 A | 12/1990 | Szepesi | |
| 5,440,159 A | 8/1995 | Larsen et al. | |
| 5,565,371 A | 10/1996 | Gill | |
| 5,838,074 A | 11/1998 | Loeffler et al. | |
| 5,886,376 A | 3/1999 | Acovic et al. | |
| 5,903,452 A | 5/1999 | Yang | |
| 5,917,222 A | 6/1999 | Smayling et al. | |
| 6,522,116 B1 | 2/2003 | Jordan | |
| 6,576,950 B1 | 6/2003 | Cappelletti et al. | |
| 6,596,587 B1 | 7/2003 | Mehta | |
| 6,696,723 B2 | 2/2004 | Hartmann et al. | |
| 6,993,314 B2 * | 1/2006 | Lim et al. | .................. 455/333 |
| 7,167,005 B2 * | 1/2007 | Mercer | ....................... 324/326 |
| 2003/0137005 A1 | 7/2003 | Mitros et al. | |

(Continued)

FOREIGN PATENT DOCUMENTS

DE        19546171 C1    11/1996

(Continued)

*Primary Examiner*—Rajnikant B Patel
(74) *Attorney, Agent, or Firm*—Muncy, Geissler, Olds & Lowe, PLLC

(57) ABSTRACT

A switching regulator for controlling transmit antennas of variable impedance, particularly transmit antennas of a keyless access authorization system in or for a vehicle, having an input terminal into which an antenna potential applied or appliable at the transmit antenna may be coupled, and having a control circuit designed to generate a compensation signal as a controlled variable for adapting the antenna potential to an actual output impedance and to establish a slope of the compensation signal depending on the actual antenna potential. The invention relates furthermore to a transceiver circuit with such a switching regulator and to a keyless access control system in or for a vehicle.

22 Claims, 5 Drawing Sheets

U.S. PATENT DOCUMENTS

2005/0236659 A1 10/2005 Koh et al.
2007/0045710 A1 3/2007 Riekels et al.

FOREIGN PATENT DOCUMENTS

| DE | 19846211 | 4/2000 |
| EP | 0268315 | 5/1988 |
| EP | 0493640 | 7/1992 |
| EP | 1091408 | 4/2001 |
| EP | 1760786 | 3/2007 |
| JP | 2006033958 | 2/2006 |

* cited by examiner

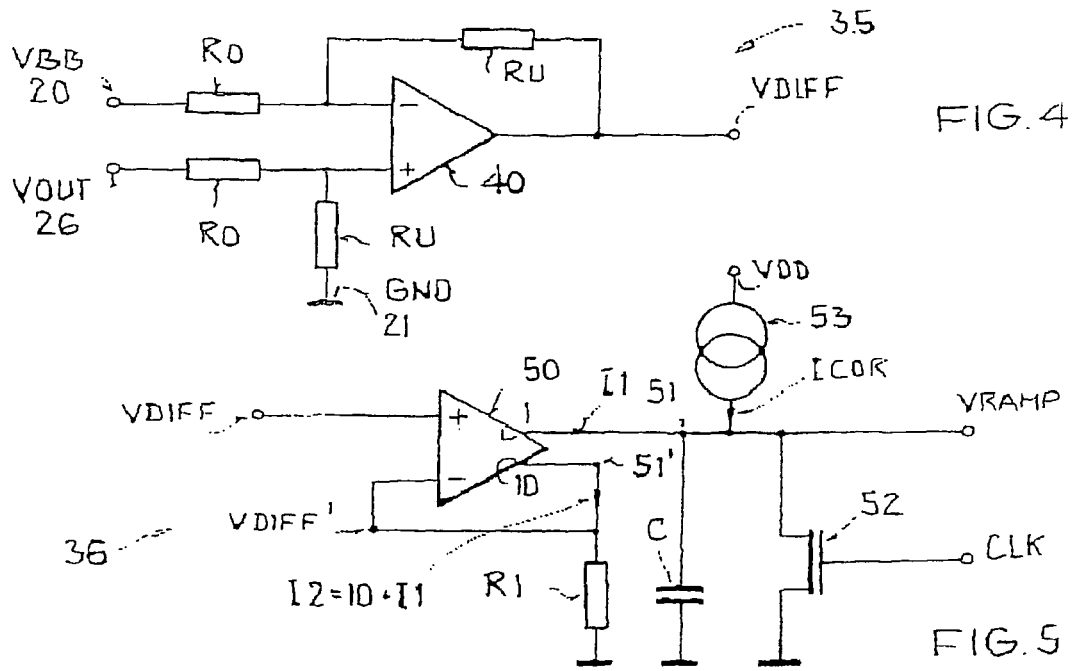
FIG. 4
FIG. 5
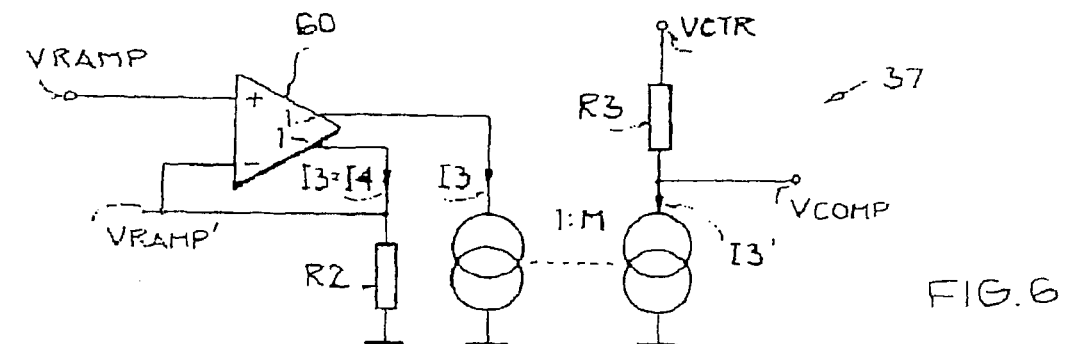
FIG. 6
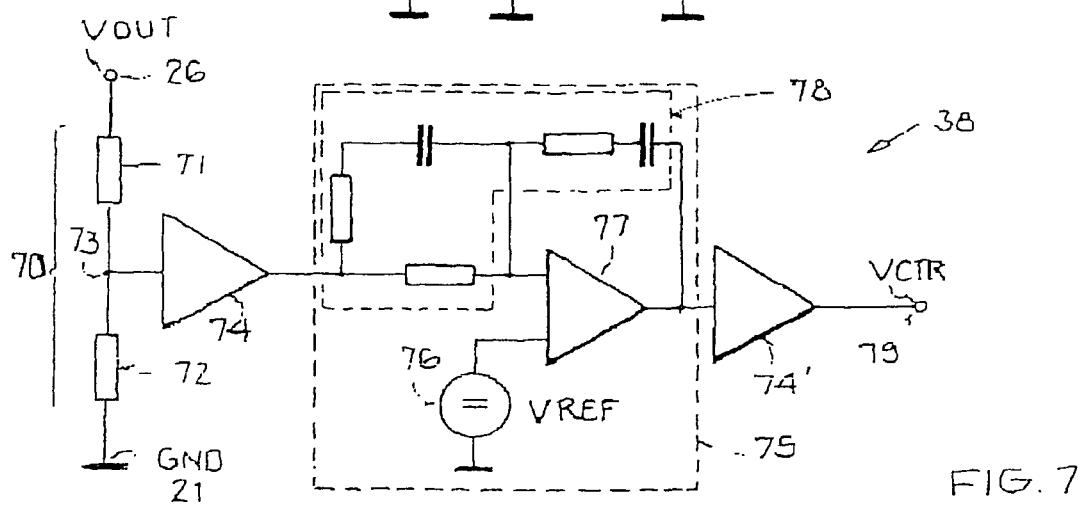
FIG. 7

_US 7,728,717 B2_

SWITCHING REGULATOR, TRANSCEIVER CIRCUIT, AND KEYLESS ACCESS CONTROL SYSTEM

This nonprovisional application claims priority to German Patent Application No. DE 102006038936, which was filed in Germany on Aug. 18, 2006, and to U.S. Provisional Application No. 60/838,376, which was filed on Aug. 18, 2006, and which are both herein incorporated by reference.

BACKGROUND OF THE INVENTION

1. Field of the Invention

The present invention relates to a switching regulator for controlling transmit antennas of variable impedance, particularly transmit antennas of a keyless access authorization system in or for a vehicle, a transceiver circuit having a switching regulator of this type, and a keyless access control system in or for a vehicle.

2. Description of the Background Art

The invention and its underlying problem are described hereafter with reference to a keyless access control system in a motor vehicle, however, without limiting the invention thereto. It is pointed out in particular that the invention may certainly also be used in other applications, for example, in switching power supplies.

Modern electronic anti-theft systems in a motor vehicle comprise an access authorization system, for example, a central locking device that can be activated by a mechanical or electronic key. Modern access authorization systems in motor vehicles enable in addition or alternatively keyless access as well. This type of system is, for example, the keyless access system with the name "Adrima" that was developed and sold by the company ATMEL Germany GmbH and works with a so-called passive access control system ("passive access"). In the passive access control system, a question-answer dialog is initiated when a user approaches his motor vehicle. In this case, a request signal is transmitted by a transmitter with a transmit antenna in the vehicle to a transponder carried by the user. When said transponder receives the request signal, it transmits, e.g., a cryptologically encoded response signal. In the motor vehicle, this response signal is received by means of a receive antenna, decoded, and compared with an expected set signal. If the response signal and set signal match, i.e., in the case of a successful authentication, the doors and optionally also the anti-theft device are unlocked.

The German patent DE 195 46 171 C1, which corresponds to U.S. Pat. No. 5,838,074, describes this type of anti-theft system for use in a motor vehicle, in which bidirectional data communication is established by means of magnetic coupling between a vehicle-side transceiver and a mobile transponder. The data communication occurs by turning on and off an alternating field generated magnetically by the transceiver according to the data to be transmitted. For this purpose, the transceiver has an inductive antenna resonant circuit, which is excited by a drive circuit. The inductor of the transceiver antenna resonant circuit is coupled magnetically to a corresponding inductor of the transponder antenna resonant circuit.

A system for passive access control may have, e.g., a control device in the vehicle and typically several inductive antennas, which are distributed in the vehicle and are connected to the control device via connecting lines generally of different lengths. These inductive antennas are activated by a switching regulator within the control device. It is problematic here that as the length of the connecting lines increases, their parasitic capacitances and inductances also increase, so that these are no longer negligible. In addition to this self-capacitance and self-inductance of the connecting lines, a capacitive fraction is also to be considered that results from the type and installation of the connecting lines in the vehicle, for example, from the effect of the vehicle body.

Another problem results from the type of transmit antennas, which ideally are to be made as identical as possible, but which in the specific technical implementation, e.g., due to the employed production technology, in fact have a more or less broad variation in the antenna impedance.

The control of the plurality of antennas is problematic here. Typically, the control device has a switching regulator for controlling all transmit antennas within the motor vehicle. The switching regulator and the output driver connected to the switching regulator are designed to control all transmit antennas of a motor vehicle with a predefined signal level that is as identical as possible, whereby a minor voltage or current fluctuation can be compensated by the switching regulator. Because of the at times highly varying antenna impedances, however, the current flowing through the different antennas also fluctuates and thereby accordingly greatly also the dropping voltage at the transmit antenna. Particularly in the vehicle sector, the antenna impedance can vary by up to several 10 ohms, so that the antenna current to be driven by the control amplifier through the antennas can vary as a result by up to several amperes. This means that the switching regulator must be designed to ensure a control stability over a relatively large load range. The switching regulator must therefore be designed to be able to switch output voltages in the range from a few volts to several 10 volts.

The particular problem here is that the switching regulator can thereby become unstable in its control stability, which overall has the result that a functioning control is no longer assured. There is the need therefore to provide a switching regulator that can regulate as precisely as possible the output voltage provided for the antenna and thereby the antenna current also during highly varying input voltages.

U.S. Pat. No. 5,903,452 describes a switching regulator with a control circuit that provides a compensation signal for regulation. The voltage ramp of the compensation signal in this case depends on a coil current tapped directly at the antenna coil and fed back, so that the regulation here is based directly on the coil current.

SUMMARY OF THE INVENTION

It is therefore an object of the present invention to provide an alternative, improved regulation in a switching regulator, which provides primarily as stable a regulation response as possible also at highly varying output voltages.

Accordingly, provided are a switching regulator for controlling transmit antennas of variable impedance, particularly transmit antennas of a keyless access authorization system in or for a vehicle, having an input terminal into which an antenna potential applied or appliable at the transmit antenna may be coupled, and having a control circuit designed to generate a compensation signal as a controlled variable for adapting the antenna potential to an actual output impedance and to establish a slope of the compensation signal depending on the actual antenna potential. Also provided is a transceiver circuit of a device for inductive data transmission, particularly a device for a keyless access control system in or for a vehicle, having at least one antenna resonant circuit for at least wireless transmission of transmit signals, and having a switching regulator of the invention designed to regulate the antenna potential in such a way that the antenna current flowing through the transmit antenna moves back and forth in a zigzag fashion between a preset lower threshold value and a preset upper threshold value, and also provided is a keyless access control system in or for a vehicle having at least one vehicle-side antenna circuit, having at least one vehicle-side transceiver circuit according to the invention, which to control the antenna circuits is connected thereto via respective connecting lines, and having at least one transponder designed to communicate with said transponder in a wireless manner with data communication upon approach to the vehicle-side transceiver circuit.

The output impedance in this case may comprise primarily the antenna impedance but also parasitic impedances, for example, the lines.

An object of the present invention is to measure both an input voltage and an output voltage that determines the coil current slope in an antenna circuit. On their basis, a voltage difference is calculated which determines the steepness of a ramp of an internal compensation signal within the switching regulator. On the basis of this internal compensation signal, a constant current is determined that is added to the output signal to reduce the effect of the voltage drop across the antenna coil. A very stable regulation response overall is obtained thereby due to a constant pulse duty factor; i.e., this achieves a very stable output voltage across the antenna coil and thus a constant antenna current.

Because of the very stable, constant pulse duty factor, an improved EMC behavior also results advantageously during use of a switching regulator of the invention or a corresponding transceiver circuit with a switching regulator of this type.

In an embodiment of the invention, the switching regulator can be formed as a boost converter or buck converter.

In another embodiment, a subtraction circuit can be provided that generates a differential signal from the antenna potential and a first supply potential by calculating the difference. Preferably, the subtraction circuit has a first differential amplifier. Typically, but not necessarily, the subtraction circuit also has two resistive voltage dividers whose resistive elements preferably have the same dimensions.

In an aspect of the invention, a voltage ramp generator can be provided that generates a ramp-shaped voltage signal from the differential signal. Preferably, the slope of the ramp-shaped voltage signal depends on the amplitude of the differential signal.

In an embodiment, the voltage ramp generator can have a second differential amplifier to generate a constant current from the differential signal and a capacitor, which is connected on the output side downstream of the second differential amplifier and is charged and discharged triggered by a clock signal.

In another embodiment, the voltage ramp generator can have a correction current source that generates a correction current superimposed on the current signal. This correction current is typically (significantly) smaller than the constant current generated by the second differential amplifier. This correction current is used for fine tuning to generate a largely homogeneous ramp-shaped signal, which therefore is to have as uniform a slope as possible.

In a further embodiment of the invention, an error amplifier can be provided that compares the antenna potential with a reference potential and generates a control signal depending on the comparison.

A linkage circuit can be provided that generates the compensation signal by linking the ramp-shaped voltage signal to the control signal generated in the error amplifier.

In an embodiment, a comparison device can be provided that compares the compensation signal with a reference signal derived from the antenna current and on the output side generates a correction signal dependent on this comparison. Preferably, a latch, which temporarily stores the correction signal generated by the comparison device, is connected downstream of the comparison device. The latch is made, for example, as a flip-flop circuit, particularly as an RS flip-flop, and is preferably triggered by an internal clock signal.

In an embodiment, at least one controllable switch, e.g., a MOSFET, can be connected on the output side downstream of the comparison device, said switch which on the control side can be controlled by a control signal provided by or derived from the comparison device and is designed to regulate the output potential of a specified voltage range depending on its control by the control signal.

In a first embodiment, a first feedback path can be provided over which an antenna current flowing through the transmit antenna can be fed back to the switching regulator. Furthermore, a second feedback path can be provided in addition or alternatively over which the antenna potential applied or appliable at the transmit antenna can be fed back to the switching regulator.

In an embodiment of the transceiver circuit, the switching regulator and the driver circuit can be designed to control the antenna current flowing through the antenna resonant circuit in such a way that during a signal transmission the transmit signal transmitted by the transmit antenna is transmitted at a specified frequency.

In an embodiment, at least one driver circuit can be provided that is arranged between a first supply terminal with a first supply potential and a second supply terminal with a second supply potential and is connected on the output side to the antenna resonant circuit. Typically, but not necessarily, the first supply terminal has a positive supply potential and the second supply terminal a reference potential, particularly the ground reference potential.

In another embodiment of the invention, the transmit antenna can be made as a coil antenna with a ferrite core. Preferably, the transmit antenna has at least one inductive transmit antenna for transmitting transmit signals. In a first embodiment, the transmit antenna is made as a series LCR resonant circuit, in which at least one capacitive element, at least one inductive element, and at least one resistive element are arranged in series to one another. In a second embodiment alternative thereto, the transmit antenna is made as a parallel LCR resonant circuit, in which at least one capacitive element and at least one inductive element are arranged parallel to one another.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 4 is a detailed circuit diagram of a first circuit block of the switching regulator of the invention of FIG. 3;

FIG. 5 is a detailed circuit diagram of a second circuit block of the switching regulator of the invention of FIG. 3;

FIG. 6 is a detailed circuit diagram of a third circuit block of the switching regulator of the invention of FIG. 3;

FIG. 7 is a detailed circuit diagram of a fourth circuit block of the switching regulator of the invention of FIG. 3;

DETAILED DESCRIPTION

Figure 1:
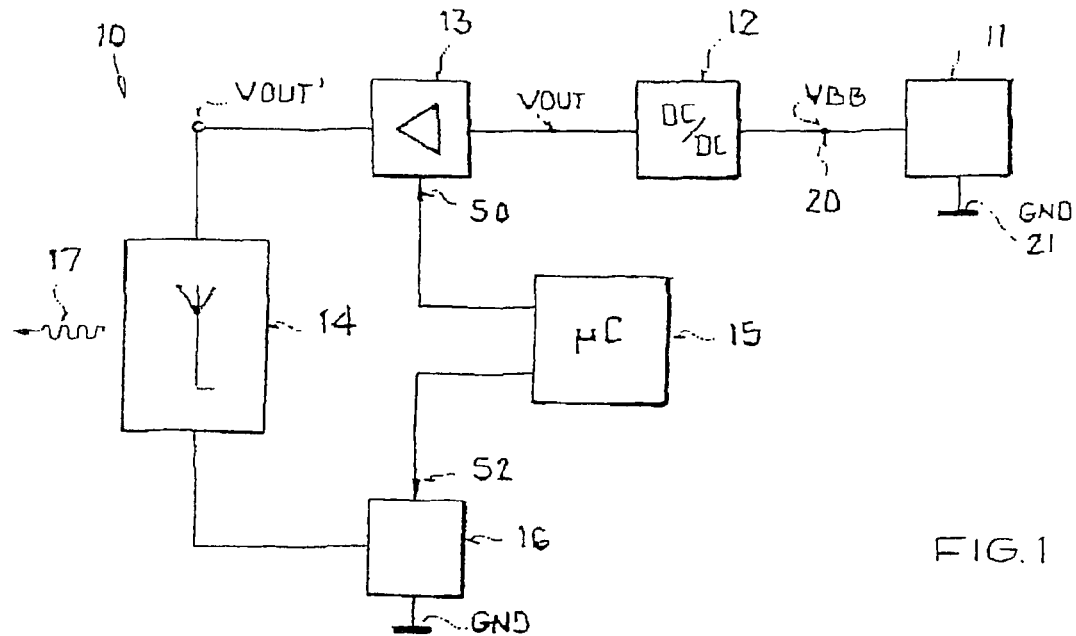
FIG. 1 is a general block diagram of a transceiver circuit of the invention.

In the figures of the drawing, the same and functionally identical elements, features, and signals, if not specified otherwise, are provided with the same reference characters.

The invention relates to a preferably fully integrated circuit arrangement for setting the compensation ramp, necessary for stable control operation of a switching regulator, of a current-operated switching regulator, such as, for example, a boost converter. Switching regulators of this type are often also called CCM (CCM=continuous current mode) boost converters in the literature. To attain the most stable regulation response possible of the switching regulator and thereby a constant pulse duty factor, the ratio necessary for the switching regulator between the actual antenna current ($\Delta IA/\Delta t$) and the internal ramp of the compensation signal must be suitably set. Because of the aforementioned additional condition, to be able to use the largest range possible for the antenna impedance (generally between 1 ohm to 40 ohm), the switching regulator made, e.g., as a boost converter may not operate with a fixedly predefined, fixed compensation ramp, but depending on the antenna and thereby particularly on the antenna impedance must independently adjust its internal compensation ramp. It is possible to realize this in a very elegant and simple way by means of the switching regulator of the invention, a largely stable regulation response being possible as a result even in highly varying antenna impedances.

The invention set forth in the present patent application thereby proceeds first from the following basic principles. The necessary output voltage VOUT is obtained from the following equations:

$$VOUT = 2 \cdot IA \cdot ZA + 2 \cdot V_{switch}, \quad (1)$$

$$VOUT = \frac{VBB - IA \cdot RL}{1 - D} - VD - VDS \cdot \frac{D}{1 - D}, \quad (2)$$

where IA designates the antenna current IA flowing through the transmit antenna, ZA the antenna impedance, and Vswitch the voltage dropping across the switch connected in series to the antenna.

The falling ramp $\Delta IL$ of the coil current is then obtained as follows:

$$\Delta IA(-) = \frac{VOUT + VD + IL \cdot RL - VBB}{L} \cdot T_{OFF}. \quad (3)$$

Thereby, the ratio of the coil current IL to the compensation is obtained as follows:

$$\frac{1}{2}\Delta I_L(-) \leq MC \text{ ideal } \Delta IL(-) = MC. \quad (4)$$

The following voltage ramp $\Delta V/\Delta Z+$ is represented internally in the voltage regulator by measuring the coil current:

$$\frac{\Delta V}{\Delta t} = \frac{R_{SENSE}}{L \cdot I_{SENSE\_RATIO}} \cdot (VOUT - VBB) + \frac{R_{SENSE}}{L \cdot I_{SENSE\_RATIO}}(ILRL + VD) \quad (5)$$

The switching to be realized by the switching regulator of the invention should thereby be represented by the following equation as a compensation ramp:

$$ML = \frac{\Delta V}{\Delta t} = \frac{R_U R_3}{R_O R_1 R_2 C} \cdot (VOUT - VBB) + \frac{R_3}{R_2 C} \cdot ICOR. \quad (6)$$

FIG. 1 shows a general block diagram of a transceiver circuit of the invention. The transceiver circuit is designated here with the reference character 10. Transceiver circuit 10 has a power supply 11, a switching regulator 12, a driver circuit 13, and an antenna circuit 14.

Power supply device 11 is formed here as a voltage supply and contains a first supply terminal 20 and a second supply terminal 21. A first supply potential VBB, for example, a positive battery potential VBB, can be tapped at first supply terminal 20, whereas a second supply potential GND, for example, a reference potential GND, is applied at second supply terminal 21. Power supply 11 is designed to supply the entire transceiver circuit 10 with power, for example, with a supply voltage (VBB-GND).

Switching regulator 12 connected to power supply 11 generates on the output side a voltage-controlled output voltage signal VOUT, which is accordingly amplified by driver circuit 13 and applied at antenna circuit 14 as the amplified regulated output potential VOUT' on the supply side. If antenna circuit 14 is activated by this output potential VOUT', it then transmits a frequency-modulated transmit signal 17 according to the activation frequency.

Transceiver circuit 10 preferably has a control device 15, for example, a microcontroller, a microprocessor, or a hard-wired logic circuit (e.g., FPGA, PLD, etc.), which controls driver circuit 13 with a control signal S0. Particularly when transceiver circuit 10 is provided for controlling several antenna circuits 14, it is advantageous that it has a selection device 16, which is controlled by control signals S2 also provided by control device 15 and which depending on this control in each case activates one or also more antenna circuits 14, so that the specifically activated antenna circuit 14 can be excited in each case by switching regulator 12 or drive circuit 13.

Figure 2:
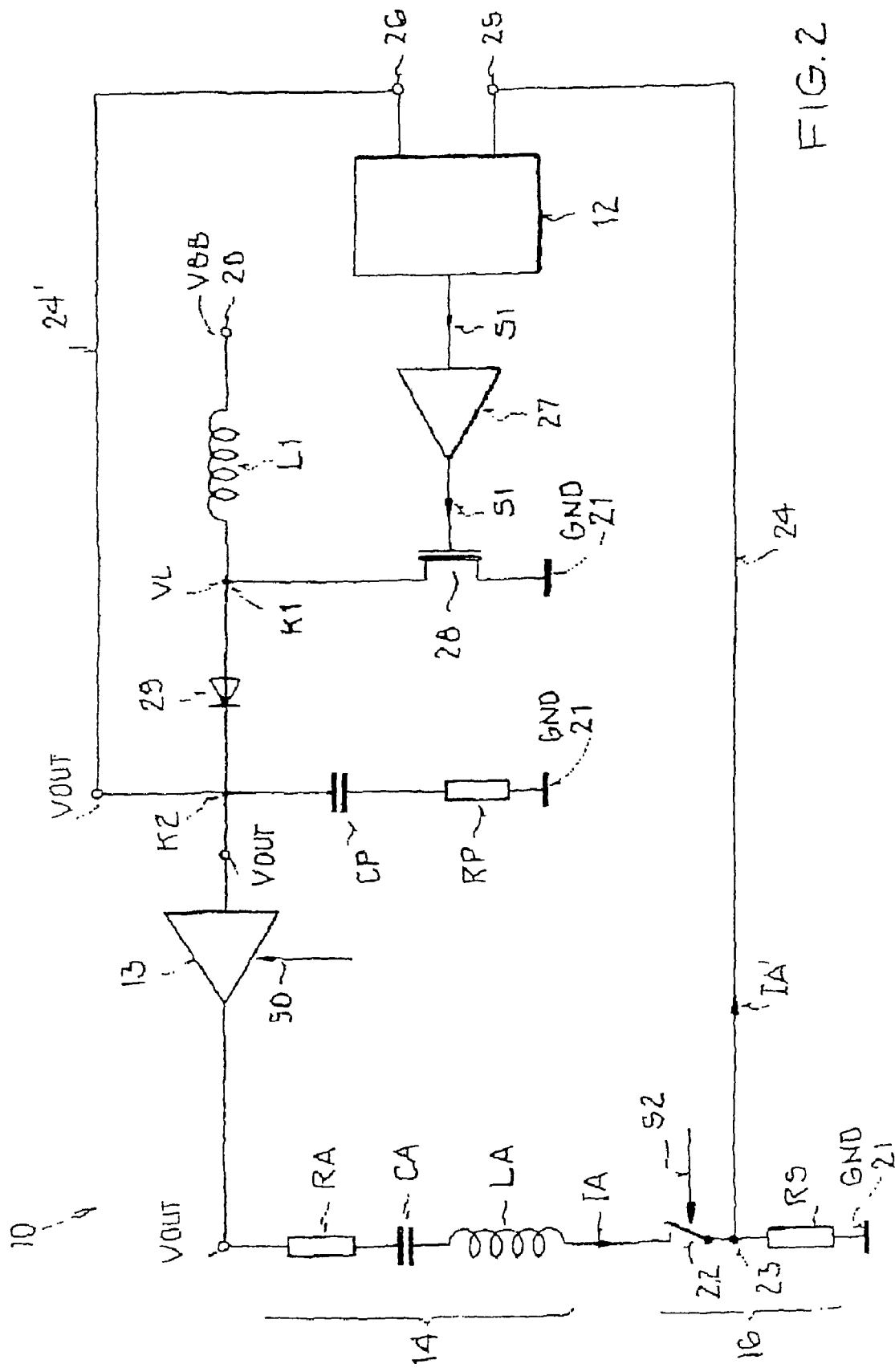
FIG. 2 is a detailed block diagram of a transceiver circuit of the invention with a switching regulator of the invention.

FIG. 2 shows a detailed block diagram of a transceiver circuit 10 of the invention. It is assumed that antenna circuit 14 of transceiver circuit 10 is made as a coil antenna with a ferrite core. The equivalent circuit of this type of coil antenna is shown in FIG. 2. Accordingly, antenna circuit 14 is made as a series LCR circuit with an inductor LA, a capacitor CA, and a resistor RA. This antenna circuit 14 is controlled by switching regulator 12 via driver circuit 13, shown here as controllable driver 13.

Selection device 16 contains a controllable switch 22 and a shunt resistor RS, which is connected in series between antenna circuit 14 and second supply terminal 21. When switch 22 is closed and antenna circuit 14 is excited in this way by output signal VOUT', an antenna current IA flows through antenna circuit 14. The then flowing antenna current IA' is tapped at a tap 23 between closed switch 22 and shunt resistor RS and supplied via a feedback branch 24 to a first input 25 of switch regulator 12.

The regulated output voltage signal VOUT, supplied as it were to controllable driver 13, is coupled into a second input 26 of switching regulator 12.

Switching regulator 12 on the basis of these signals VOUT, IA' generates an output-side control signal S1, S1' which controls via a gate driver 27 the control terminal of a controllable switch 28, for example, of a MOSFET. The controlled section of controllable switch 28 is connected between second supply terminal 21 and over a first node K1, a diode 29, and a second node K2 to the input of driver 13. The anode of diode 29 is connected via the first node K1 and an inductor L1 to first supply terminal 20 and thereby to the battery potential VBB. Depending on the control of controllable switch 28 and thereby the clock by switch 28, driver 13 is therefore supplied with the regulated output potential VOUT. This not yet amplified output potential VOUT is tapped at node K2 and supplied via a second feedback branch 24' to the second input of switching regulator 12. This node K2, at which output signal VOUT can be tapped, is connected for buffering of the output signal VOUT via a capacitor CP and a resistor RP to second supply terminal 21.

Control device 15 is not shown in FIG. 2. Furthermore, for the sake of better clarity, only a single antenna circuit 14, comparator 13, and switch 22 are shown there. It goes without saying that depending on the number of employed antennas a corresponding number of elements 13, 14, 22 is provided, whereby elements 13, 22 can be activated or deactivated by control device 15 in each case, e.g., by a multiplexer circuit (not shown in FIG. 2).

Figure 3:
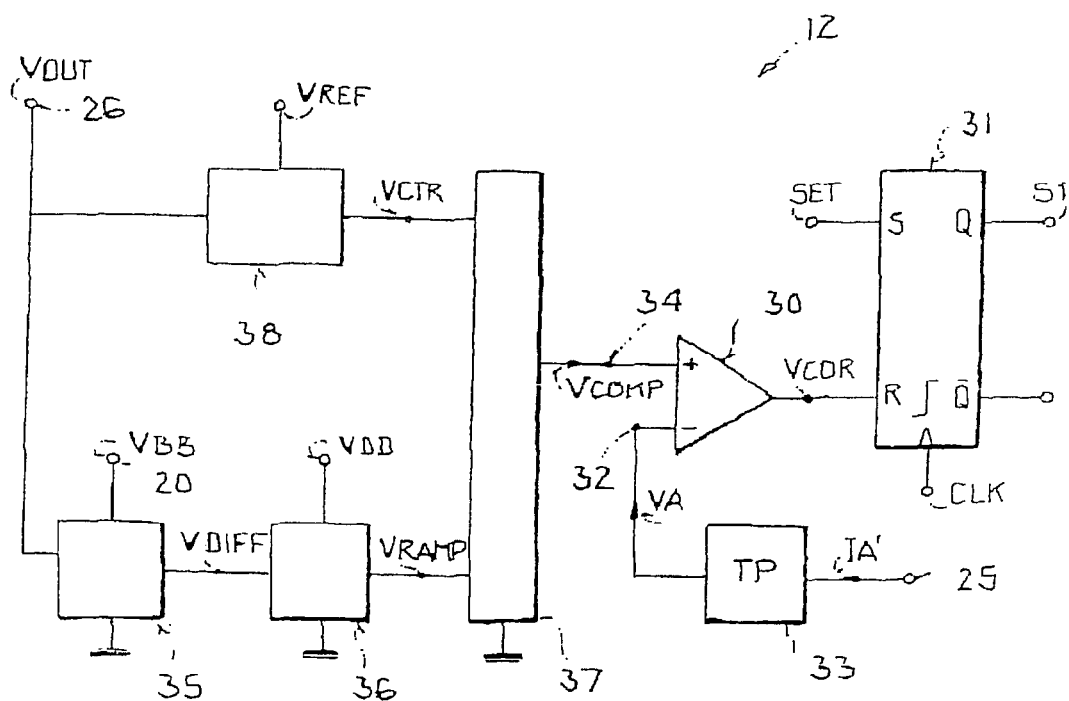
FIG. 3 is a general block diagram for a switching regulator of the invention.

FIG. 3 on the basis of a general block diagram shows the layout of a switching regulator of the invention, as may be used, for example, in the transceiver circuits in FIG. 1 or 2.

As already set forth on the basis of FIG. 2, switching regulator 12 of the invention has input terminals 25, 26, over which, on the one hand, an input current signal IA' and, on the other, an output voltage signal VOUT are coupled into switching regulator 12 as controlled variables. Switching regulator 12 has furthermore in a known manner a comparison device 30 made as a comparator and a latch 31, connected downstream of comparison device 30, for example, an RS flip-flop 31.

The antenna current signal IA', coupled via input 25 into switching regulator 12, is measured by a voltage divider and supplied to a first input 32 of comparator 30 as a voltage signal VA dependent on the measured coil current. Preferably, this voltage signal VA before coupling into comparator 30 is smoothed by a filtering device 33, for example, a lowpass filter 33. A compensation voltage signal VCOMP is coupled into a second input 34 of comparator 30. This compensation signal VCOMP is compared in comparator 30 with the voltage signal VA. Comparator 30 generates an error signal VCOR depending on the comparison. This error signal VCOR is coupled into a reset input R of flip-flop 31. A set signal SET is coupled into the set input S of the flip-flop. Flip-flop 31 is triggered by the rising edge of a clock signal CLK. The control signal S1 is then applied at data output Q of flip-flop 31 to control controllable switch 28.

According to the invention, switching regulator 12 has four circuit blocks 35-38 to generate the compensation signal VCOMP.

First circuit block 35 is connected on the input side to input 26, so that the antenna potential VOUT is supplied to it. Furthermore, first circuit block 35 is supplied via supply terminals 20, 21 with the supply potentials VBB, GND. First circuit block 35 is designed to generate a differential signal VDIFF depending on the antenna output signal VOUT and the positive supply potential VBB. This differential signal VDIFF is coupled into second circuit block 36, which is arranged connected downstream of the first circuit block 35. Second circuit block 36 is likewise supplied with a third supply potential VDD (e.g., a logic potential), which is lower than the first supply potential VBB, and with the potential of the ground reference GND. Second circuit block 36 is designed to generate a signal with a voltage ramp VRAMP from said differential signal VDIFF. Said voltage ramp signal VRAMP is coupled together with a control signal VCTR into third circuit block 37, which generates the compensation signal VCOMP for second input 34 of comparator 30 therefrom. Control signal VCTR is provided by fourth circuit block 38, which derives said control signal VCTR from the antenna potential VOUT and a reference signal VREF.

Specific preferred exemplary embodiments of each of these circuit blocks 35-38 are described in detail with use of FIGS. 4-7.

FIG. 4 shows first a detailed circuit diagram of first circuit block 35 of switching regulator 12 of the invention of FIG. 3. First circuit block 35 represents to a certain extent a subtraction circuit, which has a differential amplifier 40 and two resistive voltage dividers.

Both inputs of differential amplifier 40 are connected via respective resistors RO with inputs 26, 20; here, input 26 is connected to the positive input of differential amplifier 40 and supply input 20 to the negative input of differential amplifier 40. Another resistor RU is connected between the negative input and the output of differential amplifier 40. In a similar way, a similar resistor RU is connected between the positive input of the differential amplifier and second supply terminal 21.

Preferably, but not necessarily, the two input-side resistors RO and the two resistors RU each have the same dimensions. An input-side resistor RO and an associated resistor RU in each case form a voltage divider for differential amplifier 40. Depending on the potentials VOUT, VBB coupled into differential amplifier 40 and the dimensioning of the corresponding voltage divider resistors RO, RU, differential amplifier 40 on the output side generates the difference potential VDIFF, which is obtained in FIG. 4 as follows:

$$VDIFF = C \cdot (VOUT - VBB), \tag{7}$$

The factor C depends on the dimensioning of the two resistive voltage dividers and is obtained as follows:

$$C = \frac{RU}{RO} \tag{8}$$

FIG. 5 shows first a detailed circuit diagram of second circuit block 36 of the inventive switching regulator 12 of FIG. 3, which is connected downstream of first circuit block 35. Second circuit block 36 functions as a voltage ramp generator.

For this purpose, the difference voltage signal VDIFF is coupled into a positive input of a 1:10 differential amplifier 50, which provides at a first output 51 a first current signal I1 and at a second output 51' a second current signal I2, whose current corresponds to 10 times the current of the first current signal I1. Via a reference resistor R1 connected to the potential of the ground reference GND, this second current signal I2 is converted accordingly into a reference potential VDIFF', which is fed back to the negative input of differential amplifier 50 and there compared with the differential signal VDIFF coupled on the input side. Differential amplifier 50 thereby generates a constant current I1 on the output side depending on the differential signal VDIFF.

Second circuit block 36 furthermore has a capacitor C and a controllable switch 52, which are each connected to output terminal 51 and arranged parallel to one another relative to output terminal 51 and supply terminal 20. Controllable switch 52 is controlled on the control side by a clock signal CLK. If controllable switch 52 is turned on by the clock signal CLK, then capacitor C is charged by the constant current I1. With a turned off switch 52, capacitor C is discharged and thereby generates on the output side a ramp signal VRAMP, which defines a voltage ramp clocked by the clock signal CLK. The slope of said voltage ramp depends substantially on the amplitude of the differential signal VDIFF and thereby on the first current signal I1 derived therefrom.

In addition, second circuit block 36 can also have a correction current source 53. Said correction current source 53 is designed to generate a correction current ICOR, which is superimposed on the current signal I1. This correction current ICOR is typically much lower than current signal I1.

$$ICOR \ll I1 \quad (9)$$

As a result, the following is obtained for the ramp signal VRAMP:

$$VRAMP = \left(\frac{1}{R1 \cdot C} \cdot VDIFF + \frac{1}{C} ICOR\right) t. \quad (10)$$

FIG. 6 shows a third circuit block 37 of switching regulator 12 of the invention, which is arranged on the input side downstream of second and fourth circuit block 36, 38. Third circuit block 37 has a 1:1 differential amplifier 60, at whose first output a current signal I3 is provided depending on the ramp potential VRAMP supplied to it via second circuit block 36. At another output, according to a 1:1 ratio a current I4, which corresponds to current I3, is provided and supplied to a reference resistor R2 connected to the reference potential GND. The thereby generated reference potential VRAMP' is supplied to the negative output of differential amplifier 60 and compared with the ramp potential VRAMP.

The current I3 generated on the output side by differential amplifier 60 is reflected by a 1:M current mirror in a mirrored current I3'=M*I3 to another reference resistor R3. This additional reference resistor R3 is connected in addition to the output of fourth circuit block 38, so that reference resistor R3 is supplied with a control signal VCTR provided by the fourth circuit block 38. As the mirrored current I3' flows through reference resistor R3, the potential VC falls across reference resistor R3:

$$VC = MC \cdot t \quad (1)$$

MC here is the slope of the ramp potential VRAMP relative to the time t; i.e., the following applies for the slope MC:

$$MC = \frac{R3}{R2} VRAMP \cdot \frac{1}{t} \quad (2)$$

Because the control signal VCTR is provided by fourth circuit block 38, the compensation signal VCOMP is therefore applied at output 34 of third circuit block 37. The potential of said compensation signal VCOMP is obtained as follows:

$$VCOMP = VCTR - VC \quad (3)$$

Third circuit block 37 thereby functions as a voltage-to-current converter, whereby with reference resistors R2, R3 the ratio of the voltage-to-current conversion can have a defined setting. By linkage particularly of reference resistor R3 to the control signal VCTR, the voltage ramp generated by second circuit block 36 is represented in the ramp potential VRAMP with the ratio R3/R2 and subtracted from the control signal VCTR.

FIG. 7 shows a detailed circuit diagram for the fourth circuit block of the switching regulator of the invention, as it is shown in FIG. 3. On the input side of fourth circuit block 38, a (resistive) voltage divider 70, arranged between terminals 21, 26, is provided with two resistors 71, 72. A signal derived from the antenna potential VOUT with dimensioning of voltage divider 70 is tapped at the center tap 73 of voltage divider 70 and supplied via a buffer amplifier 74 to an error amplifier 75. Error amplifier 75 in FIG. 7 has a differential amplifier 77 and a capacitor and resistor network 78. A reference input of differential amplifier 77 is connected to a reference voltage source 76, which provides a reference voltage VREF. Preferably, the reference voltage VREF is not constant but derived from the antenna current signal IA'.

Resistor and capacitor network 78 is placed between the second input of differential amplifier 75 and its output. Voltage divider 70 and said capacitor and resistor network 78 are used for dimensioning error amplifier 75, particularly in regard to its stability and dynamics. A control signal, which is supplied via another buffer amplifier 74' to output 79 of the fourth circuit block as control signal VCTR, is provided at the output of error amplifier 75. This additional buffer amplifier 74' is used for decoupling the fourth circuit block from third circuit block 37 connected downstream of it.

The control signal VCTR is typically constant. The control signal VCTR is superimposed by the sawtooth-like, ramp-shaped voltage signal VRAMP. Both signals VCTR, VRAMP are thereby substantially derived from the antenna output signal VOUT, so that both signals VCTR, VRAMP contain information of the antenna output signal VOUT. Depending thereon, the compensation signal VCOMP is generated which functions as the control signal of switching regulator 12.

In prior-art solutions, such as, for example, in the aforementioned U.S. Pat. No. 5,903,452, the corresponding control signal is generated independent of the antenna potential VOUT obtained directly from the supply voltage. There, the current signal flowing through the antenna is coupled into a suitably formed control circuit; i.e., the antenna current signal (which in the present patent application corresponds to the current IA') is manipulated and supplied as a control signal to comparator 30. In contrast, in the present invention, the compensation signal VCOMP is manipulated by switching regulator 12 of the invention and supplied as a controlled variable to comparator 30. According to the invention, the regulation here therefore occurs in a different path and thereby with respect to a different input of comparator 30.

Figure 8:
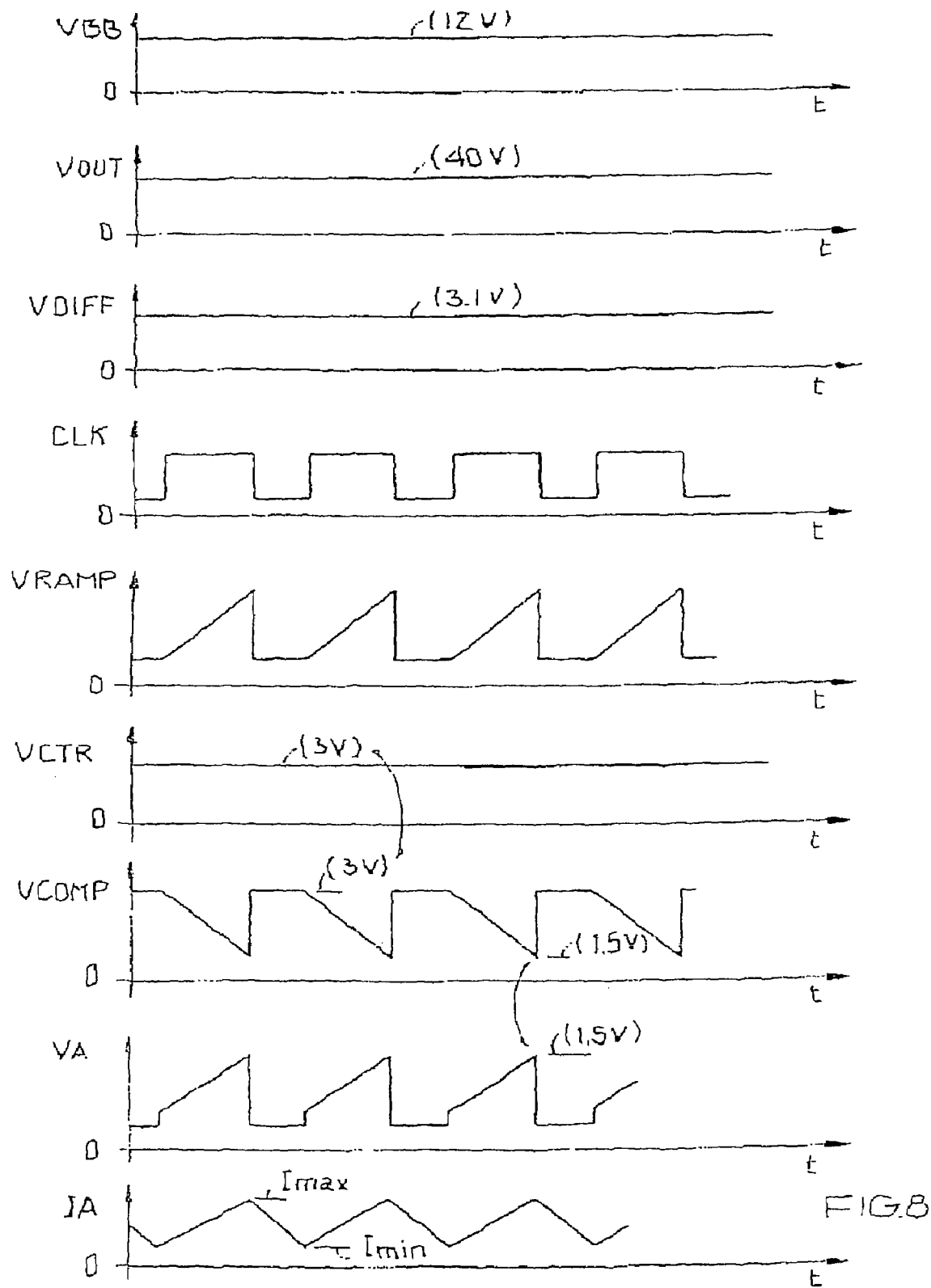
FIG. 8 is a signal-time diagram to illustrate the signals of a switching regulator of the invention.

FIG. 8 shows a signal-time diagram of the internal and external signals of the switching regulator of the invention and the transceiver circuit, as they were described by FIGS. 1-7.

It is assumed that the first supply potential VBB, which is provided, for example, by the battery, is largely constant, for example, VBB=12 V. The antenna potential VOUT is also held largely constant by the switching regulator of the invention, for example, at VOUT=40 V. A differential signal VDIFF is generated by first circuit block 35 substantially by comparison of the first supply potential VBB and the antenna potential VOUT, and here the amplitude of the differential signal VDIFF also depends on the dimensioning of the voltage divider resistors RO, RU. It is assumed that in the present case the differential signal VDIFF is approximately 3.1 V. This differential signal VDIFF is used in second circuit block 36 to generate a voltage ramp for the ramp signal VRAMP. The generation of this voltage ramp VRAMP occurs here triggered by a clock signal CLK. With a high logic level of the clock signal CLK, transistor 52 is turned on and the ramp signal VRAMP has a rising signal course. If transistor 52 is turned off by the clock signal CLK, the ramp signal VRAMP again declines to zero and remains constant as long as transistor 52 remains turned off. A sawtooth-shaped, interrupted ramp signal VRAMP is thereby generated. It is essential here that the slope of the rising edge of the ramp signal VRAMP depends on the amplitude of the differential signal VDIFF. This ramp signal VRAMP, which as before is a function of the antenna output signal (and of a clock signal CLK), is used together with a control signal VCTR to generate the compensation signal VCOMP and therefrom the correction signal VCOR. This compensation signal VCOMP thereby corresponds to an, for instance, inverted ramp signal VRAMP, the rising edge now having been converted to a falling edge of the sawtooth-shaped signal.

This compensation signal VCOMP is compared with a potential VA, derived from the antenna current IA', in comparator 30. The correction signal VCOR provided by comparator 30 on the output side and the output signal S1 delayed accordingly in flip-flop 31 then function to control a controllable switch 28 to generate the correspondingly regulated antenna potential VOUT. A current IA flowing through the antenna is generated in this way on the output side, which fluctuates in a triangular manner between a maximum coil current ($I_{max}$) and a minimal coil current ($I_{min} \neq 0$ ampere). The coil current IA can thereby not exceed a maximum value $I_{max}$. A very stable control characteristic can therefore be provided by means of switching regulator 12 of the invention, as a result of which the operating mode of transceiver circuit 10 of the invention remains assured also with very great variations in the load and thereby particularly in the antenna impedance.

Figure 9:
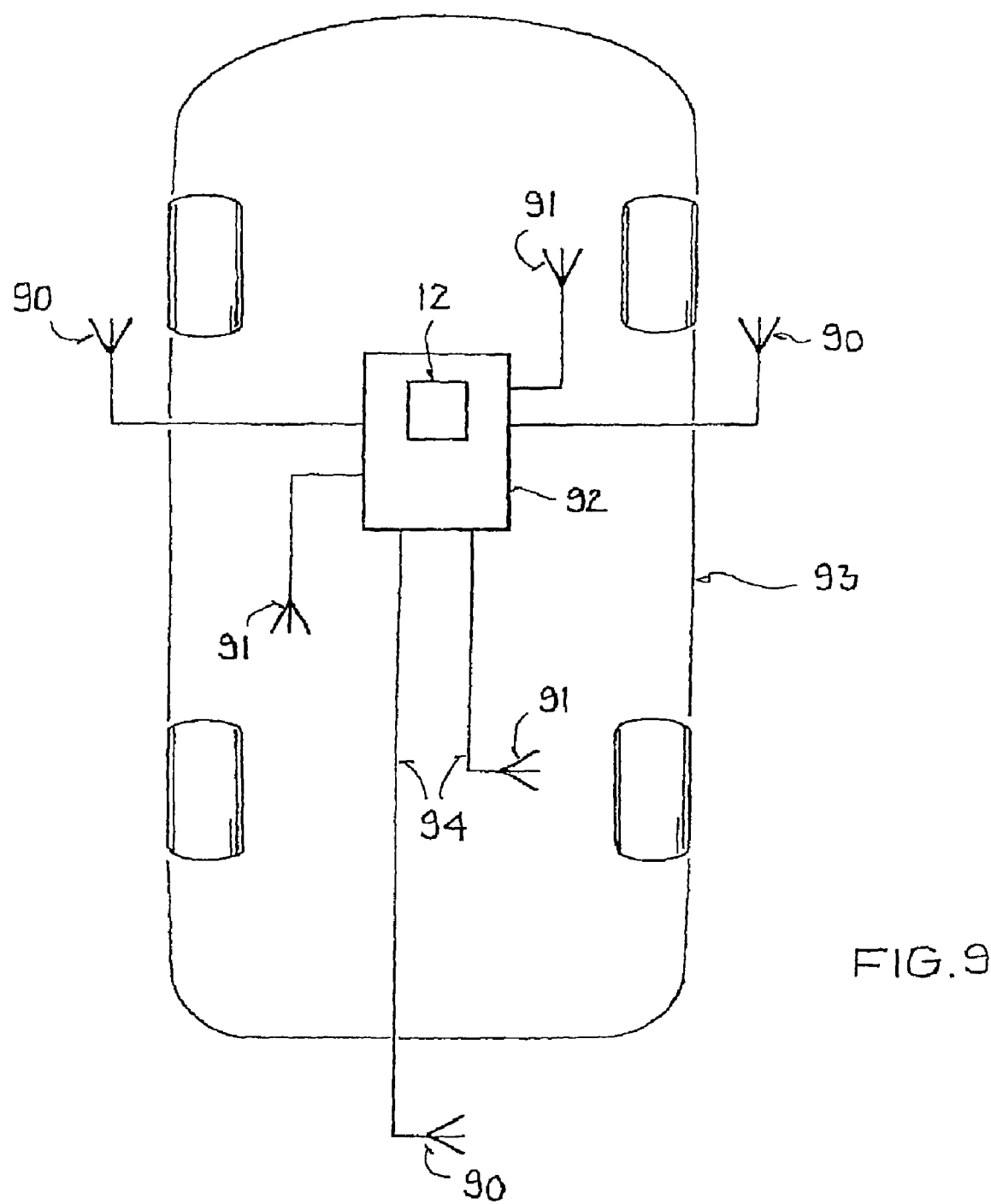
FIG. 9 illustrates, with a block diagram, the use of a transceiver circuit of the invention in a motor vehicle.

FIG. 9 shows with use of a schematic block diagram a preferred use of a transceiver circuit 10 of the invention, as is shown, for example, in FIGS. 1 and 2, in a motor vehicle. The motor vehicle is drawn only schematically in FIG. 9 with the reference character 93. The motor vehicle has a transceiver circuit 10 of the invention, which in the present exemplary embodiment has a total of six antenna devices 90, 91. In the example in FIG. 9, the antennas transmitting outwardly from motor vehicle 93 (or also receiving) are designated with reference character 90 and the antennas directed into the interior of the vehicle with reference character 91. The circuit block designated by reference character 92 contains thereby the switching regulator and the corresponding circuit parts necessary to control antennas 90, 91, such as, for example, the driver circuit, the selection device, and the control device. The various connecting lines are designated here with the reference character 94.

Although the present invention was described above with use of a specific exemplary embodiment, it is not limited thereto, but can be modified understandably in various ways. In particular, the provided numerical data are to be understood to be exemplary and should be used only to better understand the invention; i.e., they are not to limit the invention.

Thus, the invention is also not necessarily limited to a switching regulator made as a boost converter, but can be extended understandably also to other types of switching regulators, such as, for example, buck converters. The suitable adaptation of circuit elements and circuit parts of this buck converter results from the circuit topography of the buck converter.

The invention is also not limited in particular to the specific implementations of the circuit blocks of the switching regulator shown by FIGS. 4-7. It goes without saying that their functions understandably can be modified, improved, or otherwise implemented in any manner desired, without the person skilled in the art having to be inventive to accomplish this.

It goes without saying that the circuit parts and circuit elements, described with use of the aforementioned exemplary embodiments, could also be replaced by other similarly functioning or similar circuit parts.

The use with or in a motor vehicle is also to be understood only as an example, as was already mentioned previously.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A switching regulator for controlling transmit antennas of variable impedance or transmit antennas of a keyless access authorization system in or for a vehicle, the switching regulator comprising:
    an input terminal into which an antenna potential applied or appliable at the transmit antenna is coupled; and
    a control circuit for generating a compensation signal as a controlled variable for adapting the antenna potential to an actual output impedance and to establish a slope of a compensation signal depending on an actual antenna potential.

2. The switching regulator according to claim 1, further comprising a subtraction circuit that generates a differential signal from an antenna potential and a first supply potential by calculating the difference, and wherein the subtraction circuit has a first differential amplifier.

3. The switching regulator according to claim 2, wherein a voltage ramp generator is provided that generates a ramp-shaped voltage signal from the differential signal, and wherein a slope of the ramp-shaped voltage signal depends on an amplitude of the differential signal.

4. The switching regulator according to claim 3, wherein the voltage ramp generator has a second differential amplifier to generate a constant current from the differential signal and a capacitor which is connected on the output side downstream of the second differential amplifier and is charged and discharged triggered by a clock signal.

5. The switching regulator according to claim 3, wherein the voltage ramp generator has a correction current source that generates a correction current superimposed on the current signal.

6. The switching regulator according to claim 1, further comprising an error amplifier that compares the antenna potential with a reference potential and generates a control signal depending on the comparison.

7. The switching regulator according to claim 1, further comprising a linkage circuit that generates the compensation signal by linking the ramp-shaped voltage signal to the control signal.

8. The switching regulator according to claim 1, further comprising a comparison device that compares the compensation signal with a reference signal derived from an antenna current and on an output side generates a correction signal dependent on the comparison.

9. The switching regulator according to claim 8, wherein a latch, which temporarily stores the correction signal generated by the comparison device, is connected downstream of the comparison device.

10. The switching regulator according to claim 9, wherein the latch is a flip-flop circuit or an RS flip-flop, which is triggered by a clock signal.

11. The switching regulator according to claim 8, wherein at least one controllable switch is connected on the output side downstream of the comparison device, the switch, which is on a control side, is controlled by a control signal provided by or derived from the comparison device and is designed to regulate the output potential in a specified voltage range depending on its control by the control signal.

12. The switching regulator according to claim 1, further comprising:
 a first feedback path over which an antenna current flowing through the transmit antenna is fed back to the switching regulator; and
 a second feedback path over which the antenna potential applied or appliable at the transmit antenna is fed back to the switching regulator.

13. A transceiver circuit for a device for inductive data transmission or a device for a keyless access control system in or for a vehicle, the transceiver circuit comprising:
 at least one antenna resonant circuit for wireless transmission of transmit signals; and
 at least one switching regulator to regulate an antenna potential so that the antenna current flowing through the antenna resonant circuit moves back and forth in a zigzag fashion between a preset lower threshold value and a preset upper threshold value, the switching regulator comprising:
  an input terminal into which an antenna potential applied or appliable at the transmit antenna is coupled; and
  a control circuit for generating a compensation signal as a controlled variable for adapting the antenna potential to an actual output impedance and to establish a slope of a compensation signal depending on an actual antenna potential.

14. The transceiver circuit according to claim 13, wherein at least one driver circuit is provided that is arranged between a first supply terminal with a first supply potential and a second supply terminal with a second supply potential and is connected on an output side to the antenna resonant circuit.

15. The transceiver circuit according to claim 14, wherein the first supply terminal has a positive supply potential and the second supply terminal a reference potential, particularly a ground reference potential.

16. The transceiver circuit according to claim 13, wherein the transmit antenna is a coil antenna with a ferrite core.

17. The transceiver circuit according to claim 13, wherein the transmit antenna has at least one inductive transmit antenna for transmitting transmit signals.

18. The transceiver circuit according to claim 13, wherein the transmit antenna is a series LCR resonant circuit, in which at least one capacitive element, at least one inductive element, and at least one resistive element are arranged in series to one another.

19. The transceiver circuit according to claim 18, wherein the transmit antenna is a parallel LCR resonant circuit, in which at least one capacitive element and at least one inductive element are arranged parallel to one another.

20. A keyless access control system in or for a vehicle, the system comprising:
 at least one vehicle-side antenna circuit
 at least one vehicle-side transceiver circuit that is connected to the antenna circuit via respective connection lines to control the antenna circuit; and
 at least one transponder for communicating via data communication upon approach to the vehicle-side transceiver circuit, the transceiver circuit comprising:
  at least one antenna resonant circuit for wireless transmission of transmit signals; and
  at least one switching regulator to regulate an antenna potential so that the antenna current flowing through the antenna resonant circuit moves back and forth in a zigzag fashion between a preset lower threshold value and a preset upper threshold value, the switching regulator comprising:
   an input terminal into which an antenna potential applied or appliable at the transmit antenna is coupled; and
   a control circuit for generating a compensation signal as a controlled variable for adapting the antenna potential to an actual output impedance and to establish a slope of a compensation signal depending on an actual antenna potential.

21. A transceiver circuit for a keyless access control system for a vehicle, the transceiver circuit comprising:
 at least one antenna resonant circuit for wireless transmission of transmit signals, the antenna resonant circuit having an antenna configured to receive an antenna potential; and
 at least one switching regulator to regulate the antenna potential, the switching regulator comprising:
  an input terminal into which the antenna potential is configured to be coupled;
  a control circuit for generating a compensation signal as a controlled variable for adapting the antenna potential to an actual output impedance and to establish a slope of a compensation signal depending on an actual antenna potential; and
  an output terminal configured to output an output signal based on the compensation signal.

22. The transceiver circuit according to claim 21, wherein the control circuit comprises:
 a subtraction circuit that generates a differential signal from the antenna potential and a first supply potential by calculating the difference;
 a voltage ramp generator configured to generate a ramp-shaped voltage signal from the differential signal;
 a correction current source configured to compare the antenna potential with a reference potential and based on the comparison is configured to generate a control signal; and
 a linkage circuit configured to generate the compensation signal by linking the ramp-shaped voltage signal to the control signal.

* * * * *